No. 671,668. Patented Apr. 9, 1901.
A. C. W. HOBMAN.
APPARATUS FOR REMOVING HORSES OR OTHER ANIMALS.
(Application filed Dec. 11, 1900.)
(No Model.) 4 Sheets—Sheet 3.

Witnesses:
Henry Thuene.
George Baugh.

Inventor:
Alfred Christn Willm Hobman
By attorneys
Brown & Seward

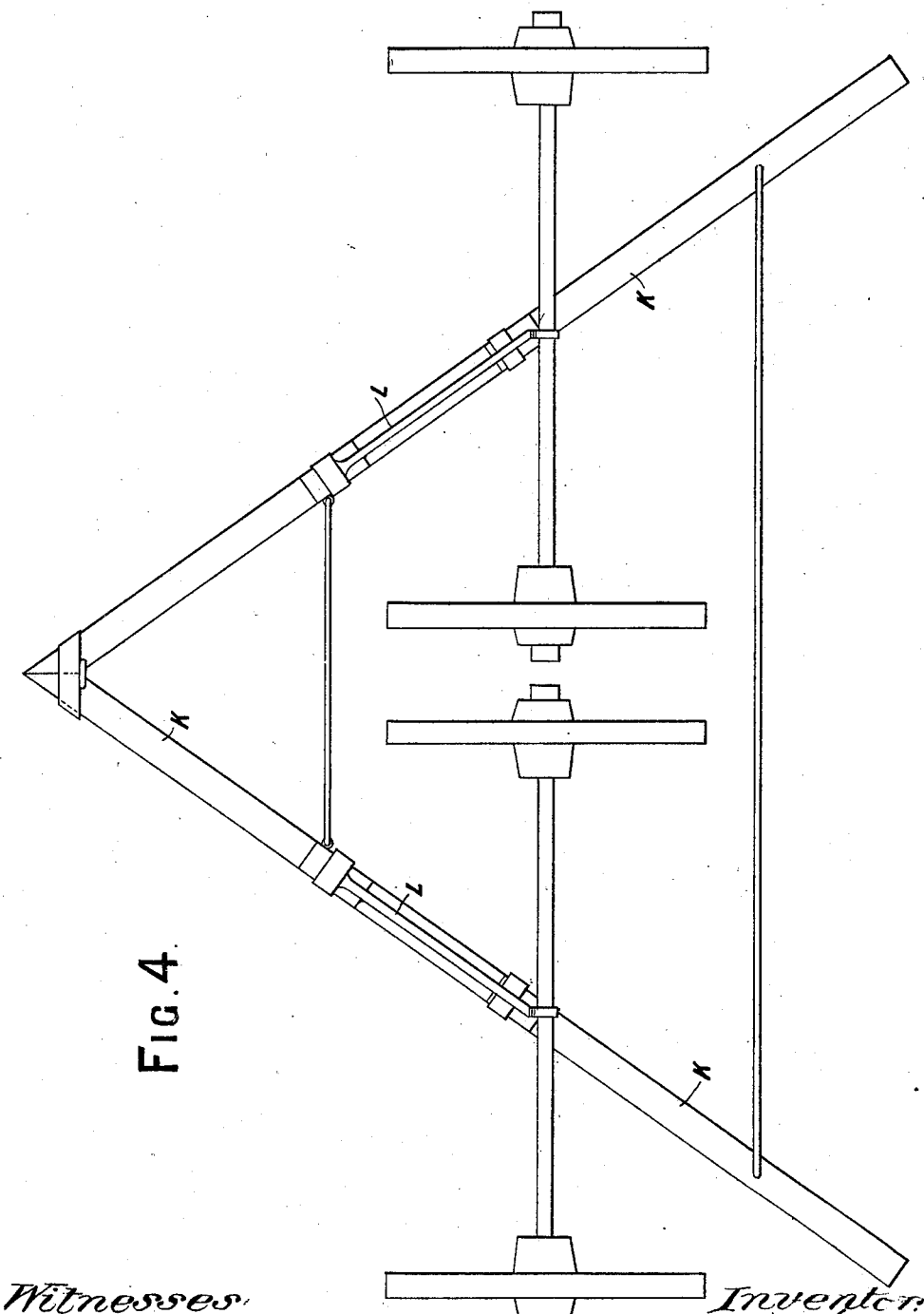

UNITED STATES PATENT OFFICE.

ALFRED CHRISTOPHER WILLM. HOBMAN, OF PECKHAM, ENGLAND.

APPARATUS FOR REMOVING HORSES OR OTHER ANIMALS.

SPECIFICATION forming part of Letters Patent No. 671,668, dated April 9, 1901.

Application filed December 11, 1900. Serial No. 39,469. (No model.)

*To all whom it may concern:*

Be it known that I, ALFRED CHRISTOPHER WILLIAM HOBMAN, a subject of the Queen of Great Britain, residing at 110 Queen's road, Peckham, in the county of Surrey, England, have invented new and useful Improvements in Apparatus for Removing Horses or other Animals, of which the following is a specification.

The object of this invention is to provide simple and convenient means for removing injured or sick horses and other animals, which apparatus will also serve as an operating-table, if desired.

Figure 1:
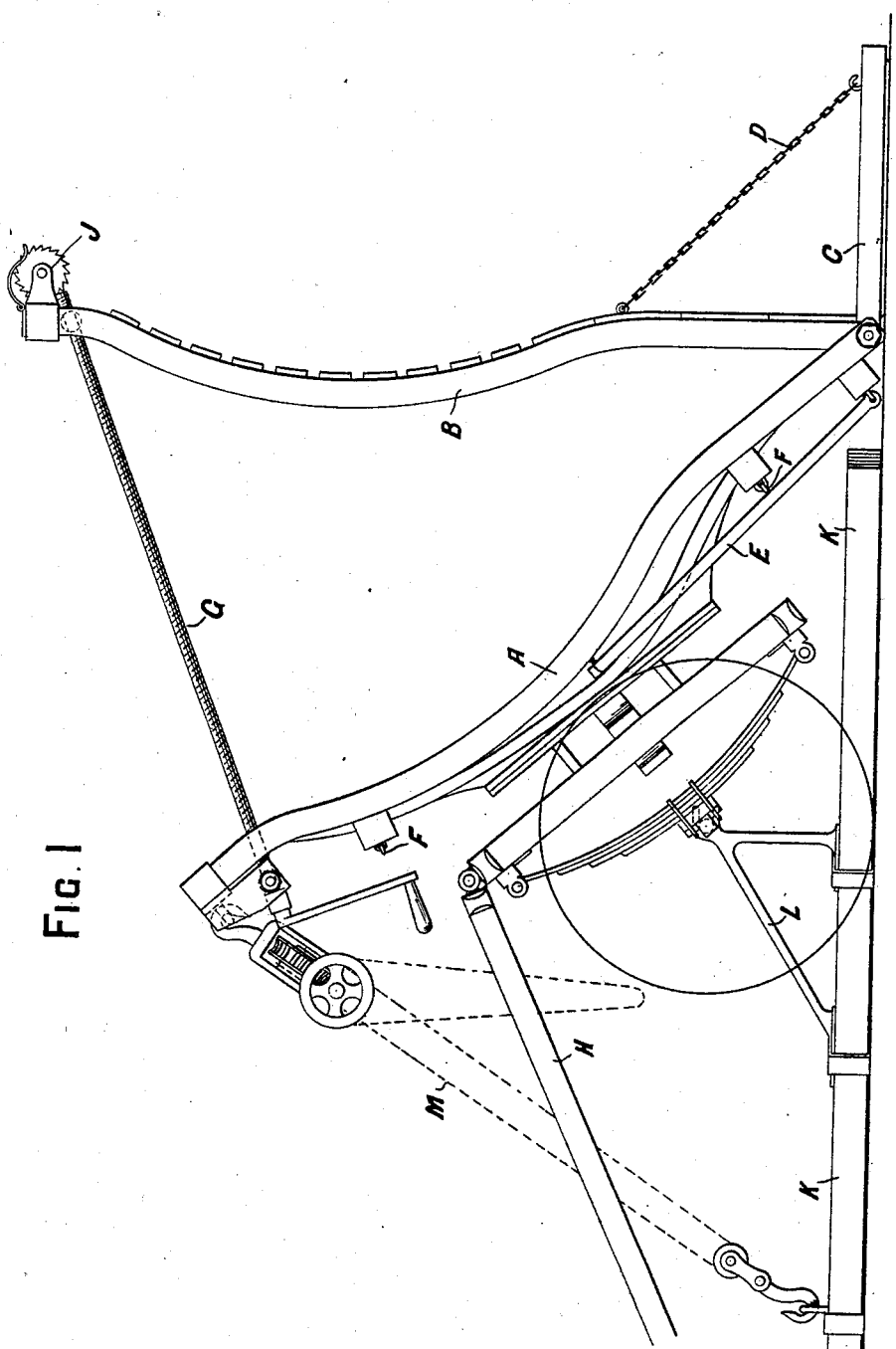
Figure 2:
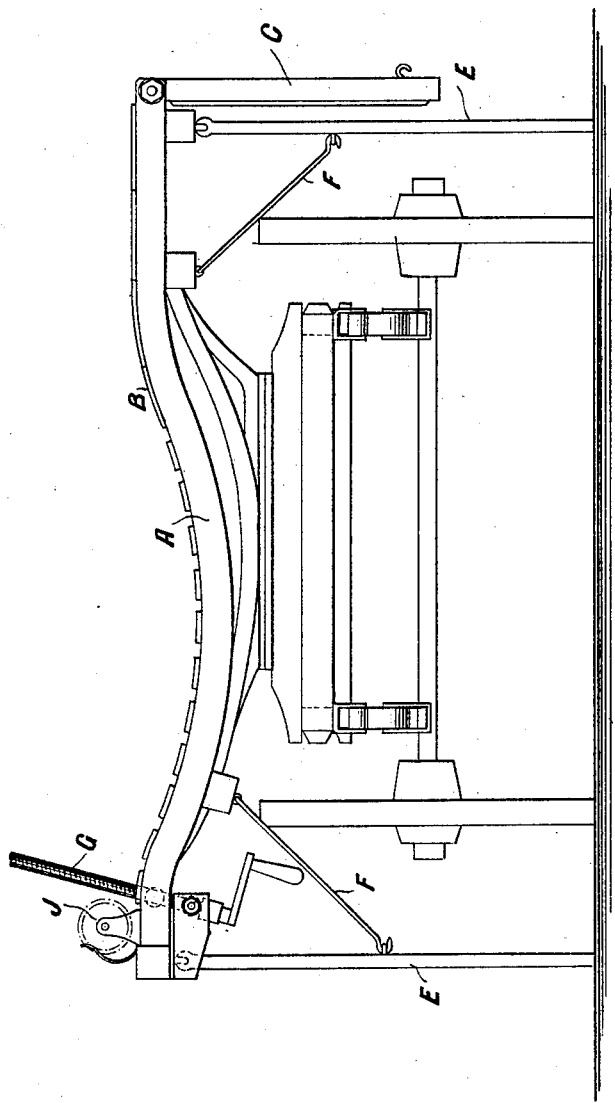
Figure 3:
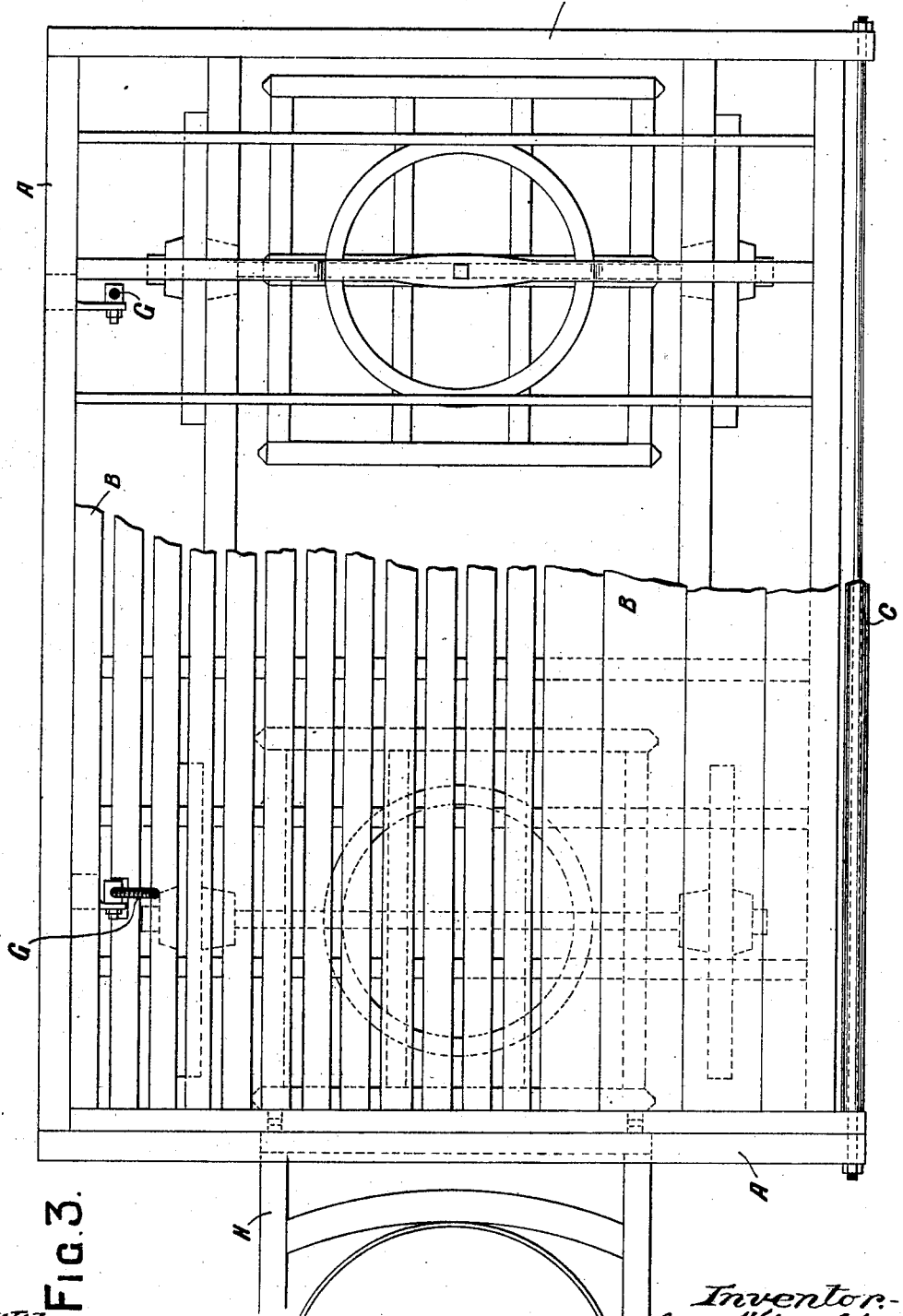

In the accompanying drawings, Figure 1 is an end view of the apparatus in the position to receive the animal. Fig. 2 is an end view of the apparatus as arranged to form an operating-table. Fig. 3 is a plan view of the apparatus, and Fig. 4 is a diagram showing means for holding the apparatus in position when loading up.

A is a frame or body which is mounted on two pairs of wheels and forms a kind of trolley. Each pair of wheels is connected to the body by an arrangement like a fore-carriage, so that that the axles may be turned longitudinally of the body to form a continuous axle, as indicated in Figs. 1 and 4. Means of any well-known character will be provided for locking these fore-carriages in any desired position.

Pivoted to one side of the body A, preferably so that it will fit within the body, is a frame B, which constitutes a table, to which the body of the animal is to be lashed in any convenient manner.

To the side of the body A, or it may be the side of the table B, is pivoted a platform C, which will be provided with chains D, by which it can be supported at a given angle from the body or table.

E E are legs, which are pivoted to the under side of the body, so that they can be let down to rest on the ground when it is desired to use the apparatus as an operating-table, as shown at Fig. 2. These legs are held in position by stays or struts F, also pivoted to the under side of the body A.

G is a threaded rod (or it may be rods) suitably carried by the body A and working in a pivoted nut on the table B. This rod is provided with a handle, by which it may be rotated when required. H represents a pair of shafts, which are attached to one of the fore-carriages in the usual way. J is a drum mounted on an axle carried in bearings on the table at the side opposite to the pivot and which is provided with a handle and pawl-and-ratchet mechanism. K is a frame which is placed on the ground and serves to securely hold or scotch the apparatus during the operation of loading up. This scotching-frame consists of beams pivoted together at one end and provided with tie-rods or stays which will hold the beams in an angular position with respect to one another and form a triangular base or frame. Attached to the beams are struts L, having forked ends which are intended to embrace the axles of the running-wheels, as shown in Fig. 4, and to serve in the place of scotch-blocks. At the apex of the triangle a ring is provided to receive a hook of suitable tackle M, the other hook of the tackle being attached to a ring on the under side of the body, as seen at Fig. 1.

The apparatus is operated as follows: The trolley being brought close to the animal, the axles of the wheels are turned a quarter-turn, so as to bring them longitudinal of the vehicle, and they are locked in this position. The scotching-frame K is then placed under the vehicle with the struts L embracing the axles, and the tackle M is hooked on. The body A is then allowed to fall gently over on its side, as shown in Fig. 1, until it touches the ground. The platform C is then allowed to fall onto the ground, and the table B is raised to a vertical position (see Fig. 1) by turning the handle of the threaded rod G. The animal is now brought onto the platform C and is secured by straps or otherwise to the table B. The chains D are then hooked onto the platform and the apparatus is ready to raise the animal off the ground. This is effected by turning the rod G in the contrary direction, so as to bring the table B down within the body A. Then by hauling on the tackle the body A is brought to a horizontal position, with the animal upon the table, and the axles are turned transversely of the body in the position shown at Figs. 2 and 3, and one of them is locked in that position, and the apparatus is then ready for the draft-animal to be put in the shafts, or the legs E E are let down to steady and support the apparatus when it is to be used as an operating-table, in which case the platform C is removed or turned down, as shown at Fig. 2. In case it is necessary to "sling" the animal the sling-ropes are wound upon the drum J until the necessary support is given to the animal.

I would here remark that I do not wish to confine myself to the mechanical details herein described and shown, as these may be varied considerably without departing from the nature of my invention.

What I claim as my invention, and desire to secure by Letters Patent, is—

1. An apparatus for removing animals consisting of a body mounted on wheel-axles arranged to turn longitudinally of the body, a table pivoted to one side of the body so as to be moved independently of the body and a platform pivoted to the same side of the body or the table and arranged to move with or independently of the table all substantially as herein shown and described.

2. An apparatus for removing animals consisting of a body mounted on wheel-axles arranged to turn longitudinally of the body, a table pivoted to one side of the body, a platform pivoted to the same side of the body or the table and arranged to move with or independently of the table, and means for moving the table independently of the body all as herein shown and described.

3. An apparatus for removing animals consisting of a body mounted on wheel-axles arranged to turn longitudinally of the body, a table pivoted to one side of the body, a platform pivoted to the same side of the body or the table, means for moving the table independently of the body, means for scotching the wheels and means for rocking the body on the longitudinal axles as herein shown and described.

4. An apparatus for removing animals, and which may also serve as an operating-table, consisting of a body mounted on wheel-axles arranged to turn longitudinally of the body, a table pivoted to one side of the body, a platform pivoted to the body or table and means for supporting the body and table in a horizontal position independently of the wheels, as herein shown and described.

In testimony whereof I have signed my name to this specification in the presence of two subscribing witnesses.

ALFRED CHRISTOPHER WILLM. HOBMAN.

Witnesses:
WALTER J. SKERTEN,
ALFRED BISHOP.